US009374317B2

(12) United States Patent
Tan et al.

(10) Patent No.: US 9,374,317 B2
(45) Date of Patent: Jun. 21, 2016

(54) PROVIDING PROVISIONING AND DATA FLOW TRANSMISSION SERVICES VIA A VIRTUAL TRANSMISSION SYSTEM

(71) Applicant: Verizon Patent and Licensing Inc., Basking Ridge, NJ (US)

(72) Inventors: Thomas H Tan, San Jose, CA (US); Deepak Kakadia, Union City, CA (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 356 days.

(21) Appl. No.: 13/918,487

(22) Filed: Jun. 14, 2013

(65) Prior Publication Data
US 2014/0372614 A1 Dec. 18, 2014

(51) Int. Cl.
*G06F 15/16* (2006.01)
*H04L 12/927* (2013.01)
*H04L 12/911* (2013.01)

(52) U.S. Cl.
CPC ............. *H04L 47/805* (2013.01); *H04L 47/824* (2013.01)

(58) Field of Classification Search
CPC .................................................... G06F 15/173
USPC ................... 709/226, 249, 224, 238, 203
See application file for complete search history.

(56) References Cited

U.S. PATENT DOCUMENTS

| 6,714,560 | B1 * | 3/2004 | Drover et al. ................. | 370/467 |
| 7,145,898 | B1 * | 12/2006 | Elliott ............................ | 370/352 |
| 7,715,438 | B1 * | 5/2010 | Frink et al. .................... | 370/474 |
| 8,009,820 | B2 * | 8/2011 | Curtis ....................... | 379/221.02 |
| 8,296,530 | B1 * | 10/2012 | Prasad et al. .................. | 711/154 |
| 8,370,481 | B2 * | 2/2013 | Wilson et al. ................. | 709/224 |
| 8,396,952 | B2 * | 3/2013 | DeCusatis et al. ............. | 709/223 |
| 8,804,518 | B2 * | 8/2014 | Manpuria et al. ............. | 370/235 |
| 9,003,411 | B2 * | 4/2015 | Wilson et al. ................. | 718/100 |
| 2002/0176450 | A1 * | 11/2002 | Kong et al. ................... | 370/539 |
| 2003/0009580 | A1 * | 1/2003 | Chen et al. .................... | 709/231 |
| 2004/0019668 | A1 * | 1/2004 | Kakadia ........................ | 709/223 |
| 2006/0056307 | A1 * | 3/2006 | Hellgren et al. .............. | 370/252 |
| 2008/0095339 | A1 * | 4/2008 | Elliott et al. ............... | 379/93.01 |
| 2009/0170557 | A1 * | 7/2009 | Chauhan et al. ........... | 455/552.1 |
| 2011/0040896 | A1 * | 2/2011 | DeCusatis et al. ............ | 709/249 |
| 2011/0202647 | A1 * | 8/2011 | Jin et al. ........................ | 709/223 |
| 2011/0211439 | A1 * | 9/2011 | Manpuria et al. ............. | 370/216 |
| 2012/0117241 | A1 * | 5/2012 | Witt et al. ..................... | 709/226 |
| 2012/0158806 | A1 * | 6/2012 | Snyder et al. ................. | 707/827 |
| 2012/0224536 | A1 * | 9/2012 | Hahn et al. .................... | 370/328 |
| 2014/0157265 | A1 * | 6/2014 | Alanis et al. ..................... | 718/1 |
| 2015/0029840 | A1 * | 1/2015 | Kotecha et al. ............... | 370/230 |

* cited by examiner

*Primary Examiner* — David Lazaro

(57) ABSTRACT

One or more devices, including one or more virtual elements associated with a virtual transmission system that emulates one or more physical devices of a physical transmission system, may receive provisioning information for a client device; provision the client device to prepare the client device to receive or transmit a data flow via the one or more virtual elements based on the provisioning information; receive the data flow; and transmit the data flow from the client device or to the client device via the one or more virtual elements based on provisioning the client device. The data flow may be transmitted or received via the one or more virtual elements to circumvent one or more gateways of the physical transmission system.

20 Claims, 7 Drawing Sheets

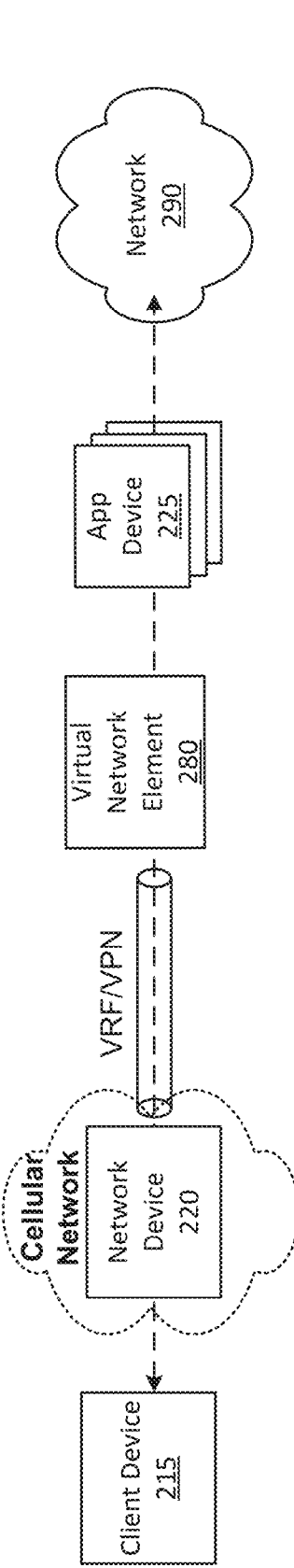
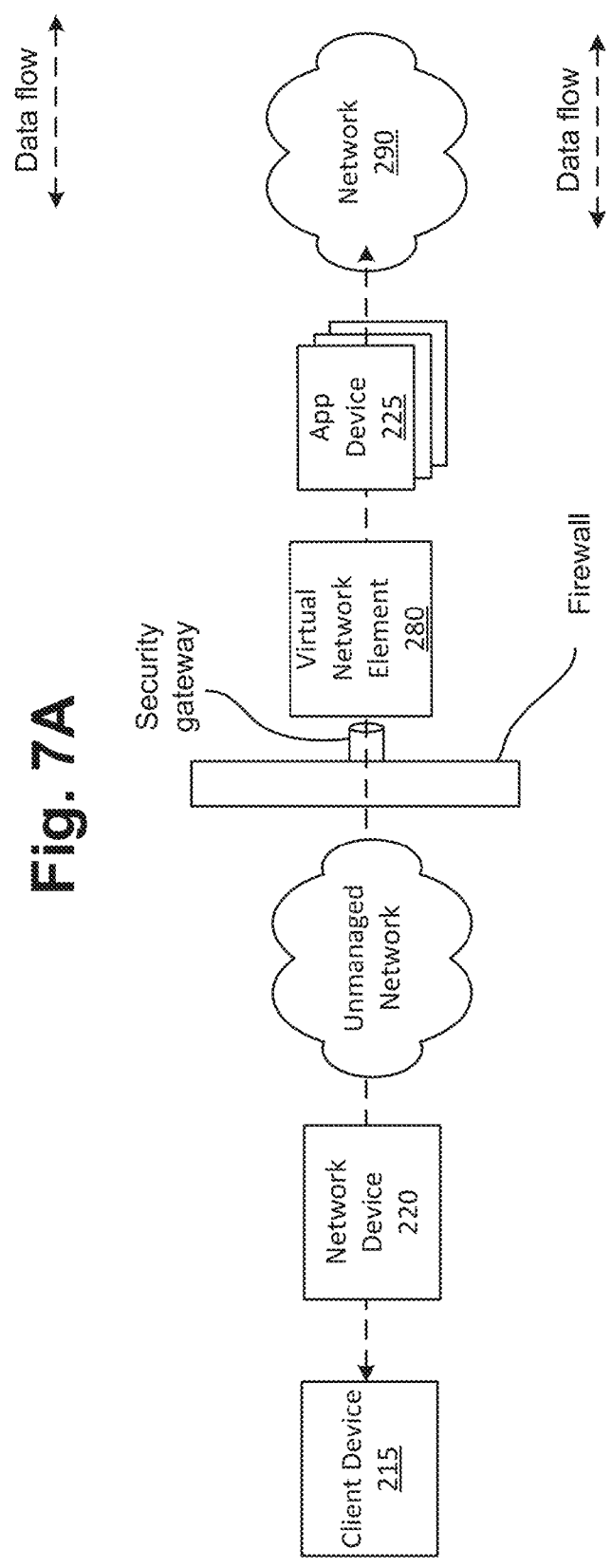

PROVIDING PROVISIONING AND DATA FLOW TRANSMISSION SERVICES VIA A VIRTUAL TRANSMISSION SYSTEM

BACKGROUND

A client device, such as a machine-to-machine (M2M) device, sometimes gathers data via one or more sensors and may process the data via one or more applications. Client devices sometimes transmit data over a network, such as a cellular network, to a data requestor, a data repository, an application server, and/or to some other location. Transmitting data over the cellular network can be costly, particularly, when a provider, associated with the cellular network, provides greater network resources than is needed to transmit the data. Further, individually provisioning multiple client devices to access the cellular network can be time consuming.

BRIEF DESCRIPTION OF THE DRAWINGS

FIGS. 7A-7B illustrate example implementations as described herein.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide data flow transmission services via a virtual transmission system (e.g., a system including one or more devices that implement one or more virtual elements having software that emulates physical hardware) to offload network load from a physical transmission system and/or to conserve network resources.

In some implementations, the virtual transmission system may provide only the network resources (e.g., bearers that implement particular bit rates, latencies, jitters, security protocols, or the like) needed to transmit data flows to/from a client device (e.g., a machine-to-machine (M2M) device and/or some other type of device), without providing excess network resources that may not be needed. For example, the physical transmission system may be associated with bearers that provide network resources that may be needed to transmit data flows to/from a user device (e.g., data flows associated with a voice and/or video telephone call, a live/interactive gaming application, a high-resolution video playback application, or the like), but provide excess network resources that are not needed to transmit data flows to/from a client device (e.g., data gathered by the client device, such as temperature measurements, product inventory measurements, resource level measurements, etc.)

In some implementations, a network used to transmit data flows to/from the client device may be subject to fewer and/or less stringent security and/or hardware redundancy requirements than a network used to transmit data flows to/from the user device.

Figure 1:
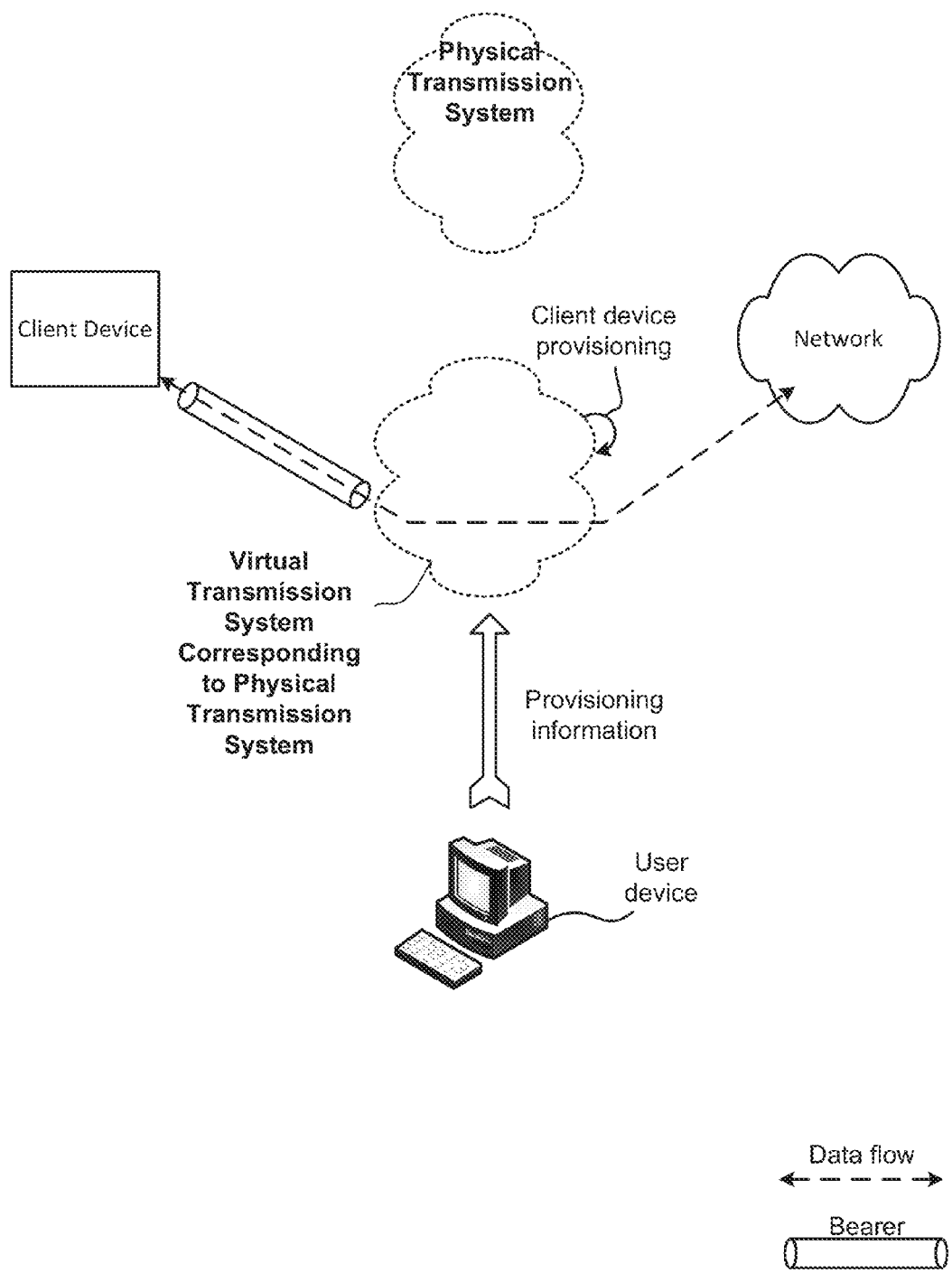
FIG. 1 illustrates an example overview of an implementation described herein.

FIG. 1 illustrates an example implementation as described herein. As shown in FIG. 1, a virtual transmission system may receive provisioning information for a client device (e.g., from a user device associated with an owner or a user of the client device). In some implementations, the provisioning information may include information identifying the client device (e.g., a client device ID) and information identifying that data flows provided to/from the client devices are to be transmitted via a virtual transmission system corresponding to a physical transmission system (e.g., for data flows that may be in need of reduced network resources for transmission).

In some implementations, the virtual transmission system may use the provisioning information to prepare the client device for data processing and for data transmission. For example, the virtual transmission system may use the provisioning information to establish a bearer between the client device and the virtual transmission system. In some implementations, the bearer may include a particular policy that identifies network resources to provide to transmit data flows to/from the client device. In some implementations, the policy may direct the virtual transmission system to provide fewer network resources for a data flow than if that same data flow where to be transmitted via a corresponding physical transmission system (e.g., sufficient network resources to transmit the data flow without providing excess network resources that may not be needed for M2M communications, thereby conserving the network resources).

In some implementations, the virtual transmission system may transmit a data flow to/from the client device in order to circumvent the physical transmission system. In some implementations, circumventing the physical transmission system may offload network load from the physical transmission system, may reduce costs, for example, by avoiding per-session costs (e.g., usage fees, service fees, licensing fees, etc.) and/or may avoid session limits associated with the physical transmission system.

In some implementations, the virtual transmission system may receive provisioning information for multiple client devices. For example, the virtual transmission system may receive an image file that includes the provisioning information for the multiple client devices. As a result, the multiple client devices may be provisioned as a group as opposed to being provisioned individually. In some implementations, virtual elements implemented by the virtual transmission system may be added and removed as needed to satisfy network resource demand. In some implementations, adding and removing virtual elements may be less costly than adding and removing physical network devices in the physical transmission system.

Figure 2:
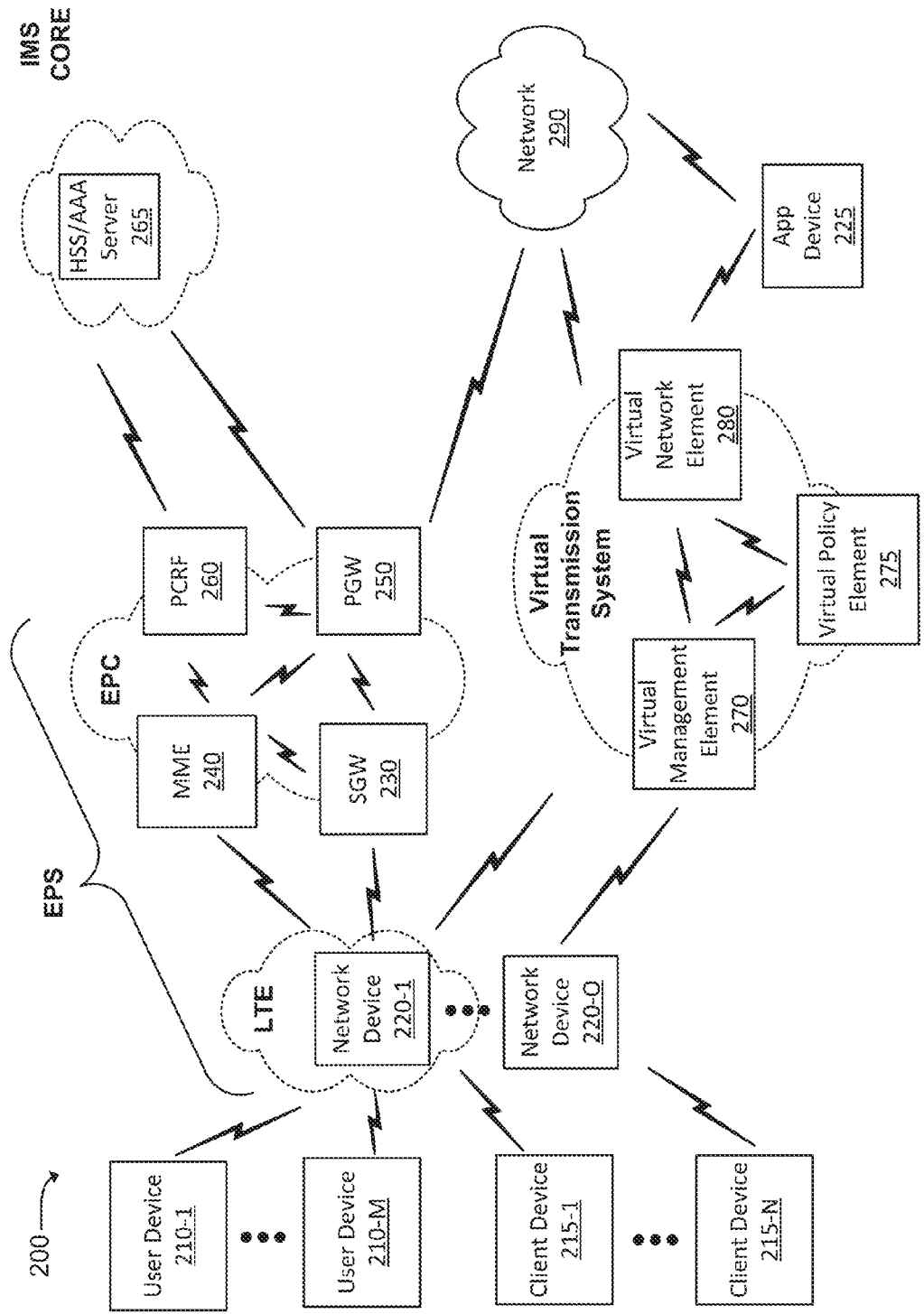
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), client devices 215-1, . . . , 215-N (where N≥1), network devices 220-1, . . . , 220-O (where O≥1), an application device 225 (referred to as "app device 225"), a serving gateway 230 (referred to as "SGW 230"), a mobility management entity device 240 (referred to as "MME 240"), a packet data network (PDN) gateway 250 (referred to as "PGW 250"), a policy charging rules function 260 (referred to as "PCRF 260"), a home subscriber server (HSS)/authentication, authorization, accounting (AAA) server 265 (referred to as "HSS/AAA server 265"), a virtual management element 270, a virtual policy element 275, a virtual network element 280, and a network 290.

In some implementations, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include a physical transmission system and may include SGW 230, MME 240, PGW 250, and/or PCRF 260 to enable user device 210 to communicate with network 280 and/or an Internet protocol (IP) multimedia subsystem (IMS) core. The IMS core may include HSS/AAA server 265 and may manage authentication, connection initiation, account information, a user profile, etc. associated with user device 210. As shown in FIG. 2, the LTE network may include network device 220. As further shown in FIG. 2, environment 200 may include a virtual transmission system that includes virtual management element 270, virtual policy element 275, and virtual network element 280.

User device 210 may include a computation or communication device, such as a wireless mobile communication device that is capable of communicating with network device 220 and/or a network (e.g., network 290). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, a desktop computer, or another type of computation or communication device. User device 210 may send data to and/or receive data from network 290.

In some implementations, user device 210 may include an operator user device 210 that is associated with an owner, an operator, or a user of client device 215. In some implementations, operator user device 210 may provide provisioning information to virtual management element 270 to cause virtual management element 270 to prepare client device 215 for data flow transmission via virtual network element 280.

Client device 215 may include one or more machine-to-machine (M2M) devices capable of communicating via a network. For example, client device 215 may include a network device (e.g., a modem, a switch, a gateway, etc.), a sensing device, a processing device, a metering device, and/or some other type of device. In some implementations, client device 215 may include a sensing or metering device to gather data (e.g., temperature measurements, resource usage measurements, motion detection, object detection, facility intrusion detection, etc.), a processing device to process the data to form processed data (e.g., via an application implemented on client device 215), and/or a network device to provide a data flow (including the processed data) towards app device 225, user device 210, and/or some other destination.

In some implementations, client device 215 may provide a data flow including a control instruction (e.g., an instruction to adjust a sensor position/configuration and/or some other type of instruction) to another client device 215. In some implementations, user device 210 may be used to access data gathered by client device 215 and/or to send a control instruction to client device 215. In some implementations, client device 215 may include another type of device that gathers, stores, processes, and/or transmits data.

In some implementations, user device 210 may function as client device 215. In some implementations, client device 215 may function as user device 210. In some implementations, user device 210 or client device 215 may function as both user device 210 and client device 215.

Network device 220 may include one or more network devices that receive, process, and/or transmit traffic, such as audio, video, text, and/or other data, destined for and/or received from user device 210. In some implementations, network device 220 may be a cellular type network device, such as an eNB device, a macro cell device, a small cell device, or the like. In some implementations, network device 220 may be part of the LTE network. In some implementations, network device 220 may be a non-cellular type network device and may not be part of the LTE network. For example, network device 220 may include a router, a hub, a switch, a wireless access point, or the like. Network device 220 may send traffic to and/or receive traffic from user device 210 and/or client device 215 via an air interface. Network device 220 may receive traffic from and/or send traffic to network 290 via the EPC (e.g., via SGW 230 and PGW 250). In some implementations, network device 220 may receive traffic from client device 215 and may provide the traffic to a virtual transmission system (e.g., via a virtual routing and forwarding (VRF) technique) to circumvent the EPC, thereby reducing network traffic of the EPC. One or more of network devices 220 may be associated with a RAN, such as the LTE network.

App device 225 may include a computing device, such as a server device, a desktop computing device, a portable computing device (e.g., a laptop, a tablet, a mobile phone, etc.), an M2M device, and/or some other type of computing device. In some implementations, app device 225 may include one or more applications that receive a data flow, originated from client device 215 (e.g., a data flow having data gathered by a sensor device of client device 215), and may perform a task based on the data flow. For example, app device 225 may perform a data analysis based on the data flow, such as a temperature trends analysis, an inventory analysis, a sales trend analysis, etc. In some implementations, app device 225 may provide a control instruction to client device 215 (e.g., an instruction to adjust a sensor position/configuration and/or some other type of instruction).

In some implementations, app device 225 may be accessed via the EPC and/or via the virtual transmission system (e.g., to provide security in accessing app device 225). That is, in order for client device 215 to access app device 225, client device 215 may access app device 225 via the EPC and/or via the virtual transmission system.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more network devices 220 and may send the aggregated traffic to network 290 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 and/or client device 215 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 and/or client device 215 (e.g., via interaction with HSS/AAA server 265).

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 and/or client device 215 to external packet data networks by being a traffic exit/entry point for user device 210 and/or client device 215. PGW 250 may perform policy enforcement, packet filtering, charging support, lawful intercept, and/or packet screening. PGW 250 may also act as an anchor for mobility between 3GPP and non-3GPP technologies.

PCRF 260 may include one or more network devices, that may store subscriber information, such as voice call and data rate plans or quotas for subscribers. PCRF 260 may provide network control regarding service data flow detection, gating, (Quality of Service) QoS, and/or flow based charging. Policies and rules regarding QoS may include policies and rules instructing user device 210, client device 215, and/or network devices (e.g., network device 220, SGW 230, MME 240, PGW 250, etc.) to minimize packet loss, to implement a packet delay budget, to provide a guaranteed bit rate (GBR), to provide a particular latency, and/or to perform other activities associated with QoS. PCRF 260 may provide policies and rules to other network devices, such as HSS/AAA server 265, and/or PGW 250, to implement network control. PCRF 260 may determine how a certain service data flow shall be treated, and may ensure that user plane traffic mapping and QoS is in accordance with a user's profile and/or network policies.

HSS/AAA server 265 may include one or more computing devices, such as a server device or a collection of server devices. In some implementations, HSS/AAA server 265 may manage, update, and/or store, in a memory associated with HSS/AAA server 265, profile information associated with user device 210 and/or client device 215 that identifies applications and/or services that are permitted for and/or accessible by user device 210 and/or client device 215, bandwidth or data rate thresholds associated with the applications or services, information associated with a user of user device 210 and/or client device 215 (e.g., a username, a password, a personal identification number (PIN), etc.), rate information, minutes allowed, and/or other information. Additionally, or alternatively, HSS/AAA server 265 may include a device that performs authentication, authorization, and/or accounting (AAA) operations associated with a communication connection with user device 210 and/or client device 215.

In some implementations, the virtual transmission system may include a server device or a collection of server devices that implement one or more virtual machines. In some implementations, each virtual machine may include one or more virtual elements. Alternatively, a particular virtual element may be implemented across multiple virtual machines.

A virtual element may include software applications, scripts, or the like that perform a particular function of the virtual transmission system. For example, the virtual transmission system may include one or more virtual machines having a virtual management element 270, a virtual policy element 275, and a virtual network element 280. In some implementations, the virtual transmission system may be used to provide provisioning services and transmission services for client devices 215 to circumvent a physical transmission system, such as the EPC (e.g., because client devices 215 may need a reduced amount of network resources for data flow transmission than other devices in environment 200, such as user devices 210). In some implementations, the virtual transmission system may be implemented in a data center and may be associated with a different party than the EPC.

In some implementations, the virtual transmission system may transmit a data flow received from client device 215 via a cellular type network device 220. Additionally, or alternatively, the virtual transmission system may transmit a data flow from client device 215 via a non-cellular type network device 220. In some implementations, the virtual transmission system may transmit a data flow to/from client device 215 to/from one or more user devices 210, one or more app devices 225, and/or some other device. In some implementations, the virtual transmission system may transmit a data flow without involving the EPC, thereby reducing costs associated with transmitting data flows via the EPC.

Virtual management element 270 may perform functions similar to that of HSS/AAA servers 265. For example, virtual management element 270 may store subscription information associated with client devices 215. In some implementations, virtual management element 270 may store information identifying that data flows provided to/from client device 215 are to be processed via the virtual transmission system (e.g., to provide the data flows with a reduced amount of network resources). Additionally, or alternatively, virtual management element 270 may store billing related information that identifies charges associated with providing provisioning and/or transmission services for client devices 215.

In some implementations, virtual management element 270 may receive provisioning information and may provision client device 215 based on the provisioning information and based on a status of client device 215. In some implementations, virtual management element 270 may monitor the status of client device 215 (e.g., application versions for applications implemented by client device 215, performance statistics associated with client device 215, etc.).

In some implementations, virtual management element 270 may create an additional virtual network element 280 when a virtual network element 280 is overloaded (e.g., when a measure of network load of virtual network element 280 exceeds a particular threshold) to alleviate the overloaded virtual network element 280. Additionally, or alternatively, virtual management element 270 may remove a virtual network element 280 when the virtual network element 280 is under-loaded (e.g., when a measure of network load of virtual network element 280 is less than a particular threshold).

Virtual policy element 275 may perform functions similar to that of one or more PCRFs 260. For example, virtual policy element 275 may receive policy information and may communicate with virtual network element 280 to enforce the policies in order to provide a particular network resource when transmitting a data flow.

Virtual network element 280 may perform functions similar to that of one or more SGWs 230, MMEs 240, and/or PGWs 250. For example, virtual network element 280 may transmit a data flow to/from client device 215 (e.g., to/from one or more user devices 210, app devices 225, etc.) using a particular network resource. The particular network resource may be based on a policy received from virtual policy element 275.

In some implementations, the virtual transmission system may include some other virtual element. For example, the virtual transmission system may include an app device virtual element to perform functions similar to those of app device 225.

Network 290 may include one or more wired and/or wireless networks. For example, network 290 may include a cellular network (e.g., a second generation (2G) network, a third generation (3G) network, a fourth generation (4G) network, a fifth generation (5G) network), a public land mobile network (PLMN), and/or another network. Additionally, or alternatively, network 290 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
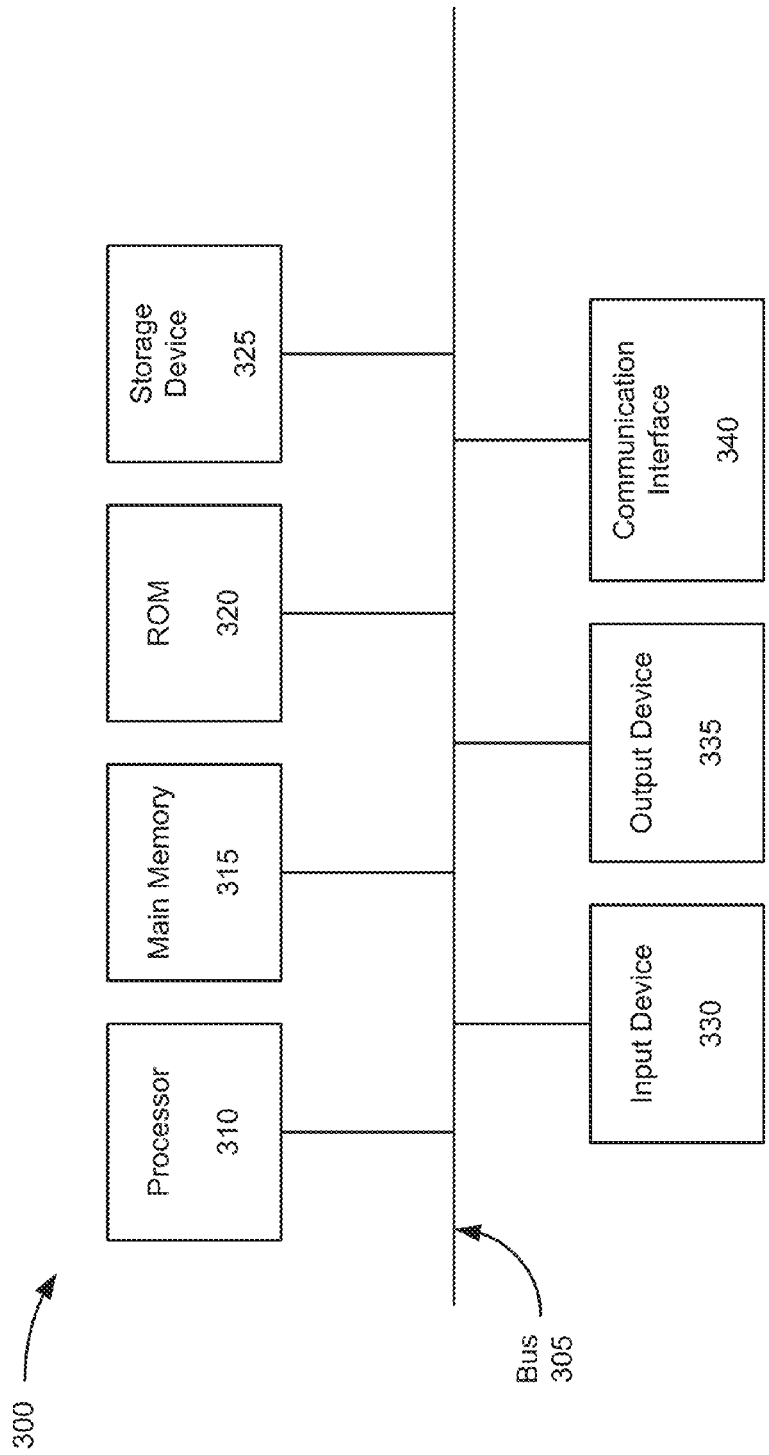
FIG. 3 illustrates example components of a device that may be used within the environment of FIG. 2.

FIG. 3 illustrates example components of a device 300 that may be used within environment 200 of FIG. 2. Device 300 may correspond to user device 210, client device 215, network device 220, app device 225, SGW 230, MME 240, PGW 250, PCRF 260, HSS/AAA server 265, and/or a device implementing virtual management element 270, virtual policy element 275, and/or virtual network element 280. Each of user device 210, client device 215, network device 220, app device 225, SGW 230, MME 240, PGW 250, PCRF 260, HSS/AAA server 265, and/or a device implementing virtual management element 270, virtual policy element 275, and/or virtual network element 280 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device.

Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
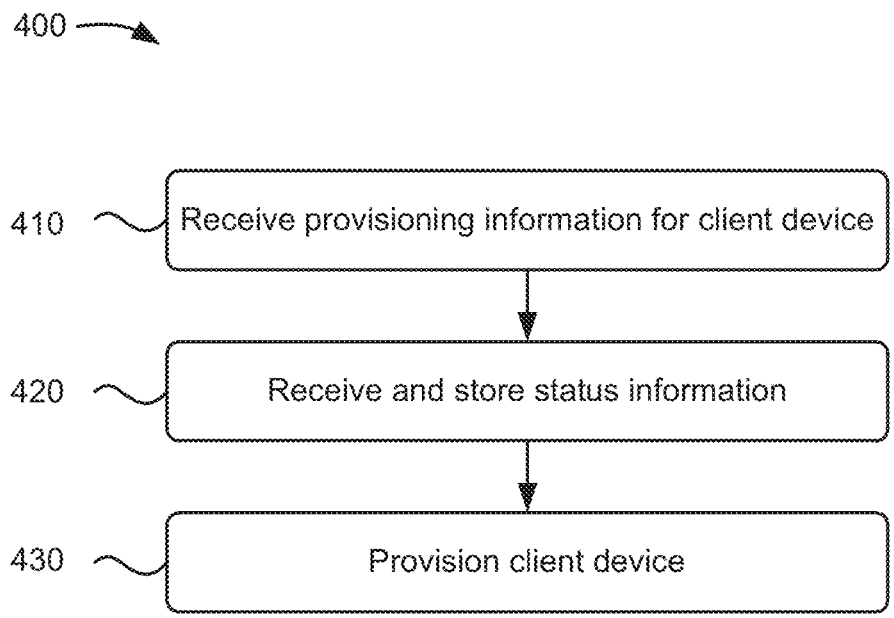
FIG. 4 illustrates a flowchart of an example process for provisioning a client device and transmitting a data flow via a virtual network device.

FIG. 4 illustrates a flowchart of an example process for provisioning a client device for transmission of a data flow via a virtual network device. In some implementations, process 400 may be performed by one or more components of virtual management element 270. In some implementations, some or all of blocks of process 400 may be performed by one or more components of another device in environment 200 (e.g., network device 220, SGW 230, MME 240, PGW 250, PCRF 260, HSS/AAA server 265, virtual policy element 275, and/or virtual network element 280), or a group of devices including or excluding virtual management element 270.

As shown in FIG. 4, process 400 may include receiving provisioning information for a client device (block 410). For example, virtual management element 270 may receive provisioning information via a computer file (e.g., an image file, a configuration file, or the like) from a storage medium associated with virtual management element 270. Additionally, or alternatively, virtual management element 270 may receive the provisioning information from an operator or other party associated with client device 215 (e.g., via an owner user device 210 and/or via some other source). For example, virtual management element 270 may link with a database or repository that stores the provisioning information for client device 215.

In some implementations, the provisioning information may include an identifier of client device 215 and may include an indication that data flows are to be transmitted to/from client device 215 via a virtual transmission system (e.g., to circumvent transmission of the data flows via a physical transmission system, such as an EPC or another transmission system that provides greater network resources than needed to transmit the data flows). In some implementations, the provisioning information may include information identifying applications to install on client device 215 (e.g., to allow client device 215 to process gathered data), particular app devices 225 to provide data flows for processing, information identifying one or more sensors associated with client device 215, information identifying transmission policies for data flows provided to/from client device 215, and/or some other information identifying how virtual management element 270 is to prepare/provision client device 215 for data flow transmission services. Additionally, or alternatively, the provisioning information may include information identifying access network type priority. For example, the provisioning information may include a prioritized list that identifies that client device 215 is to connect to a non-cellular network device 220 for connectivity to connect with a cellular network device 220 if the non-cellular network device 220 is unavailable.

In some implementations, the transmission policies may include bearer policies, such as QoS policies for a bearer via which the data flows are to be transmitted. Additionally, or alternatively, the transmission policies may include transmission instructions, such as times in which data gathered by client device 215 is to be transmitted, recipients that may receive the data gathered by client device 215, and/or some other transmission instruction. In some implementations, the transmission policies may be based on a class of data corresponding to a particular sensor of client device 215. For example, data gathered by a first sensor of client device 215 may correspond to "class 1" data, whereas data gathered by a second sensor of client device 215 may correspond to "class 2" data. As described in greater detail with respect to FIG. 5, a particular data class may correspond to a particular transmission policy. That is, class 1 data may be associated with a different transmission policy than class 2 data. In some implementations, a class may relate to network resources that may be provided to transmit a data flow.

In some implementations, an operator user device 210, associated with client device 215, may communicate with virtual management element 270 (e.g., via a web portal) to select transmission polices based on charges that an operator or user of client device 215 may be willing to incur. As described in greater detail below, the transmission policies may affect charges associated with transmitting a data flow. For example, the charges may be based on the QoS policies and/or based on a time of day in which data is transmitted (e.g., lower charges when data is transmitted at off-peak times).

Process 400 may also include receiving and storing status information (block 420). For example, virtual management element 270 may receive status information from client device 215 when client device 215 connects to virtual management element 270. In some implementations, client device 215 may connect to virtual management element 270 when client device 215 is powered on and/or in preparation for when client device 215 is to provide a data flow for transmission. For example, when client device 215 connects to virtual management element 270, client device 215 may provide an identifier, such as a multicast broadcast identifier, a serial number, and/or some other identifier (e.g., using a multicast daemon or using some other technique). In some implementations, client device 215 may further provide a code and/or some other information that identifies one or more applications currently installed on client device 215 (e.g., an operating system, an application used to process data gathered by client device 215, or the like). In some implementations, the information may identify version numbers of the one or more applications.

In some implementations, virtual management element 270 may identify the status of client device 215 based on receiving the identifier and the information identifying the one or more applications. For example, virtual management element 270 may identify whether the one or more applications are up to date (e.g., based on a version number of the applications). Additionally, or alternatively, virtual management element 270 may perform a performance status check on client device 215 to identify whether client device 215 is performing within a performance parameter. For example, virtual management element 270 may perform a ping test to identify that client device 215 is responding to ping messages. Additionally, or alternatively, virtual management element 270 may perform a packet-loss test to identify a packet-loss rate associated with client device 215. Additionally, or alternatively, virtual management element 270 may perform some other type of test to measure a performance of client device 215 (e.g., a CPU performance test, or the like). Additionally, or alternatively, virtual management element 270 may scan for and/or remove viruses or malware from client device 215.

Process 400 may further include provisioning the client device (block 430). For example, virtual management element 270 may provision client device 215 based on the provisioning information and based on the status information regarding client device 215. In some implementations, virtual management element 270 may provision client device 215 when client device 215 is performing within a performance parameter (e.g., when client device 215 responds to ping messages, when a packet-loss rate is less than a particular threshold, when a measure of CPU performance satisfies a particular threshold, etc.). In some implementations, virtual management element 270 may provide an alert (e.g., to user device 210) when client device 215 is not performing within a performance parameter such that an owner or user of client device 215 may troubleshoot client device 215 in order to bring the performance of client device 215 to within the performance parameter.

In FIG. 4, assume that client device 215 is performing within the performance parameter. Given this assumption, virtual management element 270 may provide client device 215 with authentication information to allow client device 215 to access virtual network element 280 for data flow transmission services. In some implementations, virtual management element 270 may install an application on client device 215 (e.g., by providing an image having the application to client device 215), for example, when the provisioning information identifies that client device 215 is to use the application to process data gathered by client device 215 and when client device 215 does not include the application. In some implementations, virtual management element 270 may update an application when the application is out of date (e.g., based on a version number of the application).

In some implementations, virtual management element 270 may provide client device 215 with an instruction to provide data, gathered by client device 215, to a particular app device 225 for processing. In some implementations, virtual management element 270 may provide client device 215 with a transmission instruction that identifies when client device 215 is to transmit data gathered by client device 215, a recipient of the data, and/or some other transmission instruction. In some implementations, virtual management element 270 may provide client device 215 with an indication that client device 215 is provisioned and may transmit/receive data flows via virtual network element 280. In some implementations, virtual management element 270 may associate a particular IP address with client device 215 to cause data flows, associated with client device 215, to be processed by a particular virtual network element 280 and/or a particular app device 225.

In some implementations, virtual management element 270 may provide policy information to virtual policy element 275 (e.g., based on the provisioning information that identifies the policy information) and an identifier of client device 215 to virtual network element 280. In some implementations, virtual policy element 275 may generate a policy instruction for virtual network element 280 to enforce policies that identify how data flows transmitted to/from client device 215 are to be treated (e.g., network resources that are to be provided when transmitting the data flows). In some implementations, virtual network element 280 may receive the policy instruction and may also receive the identifier of client device 215. Based on the identifier of client device 215 and based on the policy instruction policy generated by virtual policy element 275, virtual network element 280 may establish a bearer with client device 215.

In some implementations, the bearer may include the policies such that particular network resources are provided when transmitting data flows. As described herein, client device 215 may receive/transmit data flows via the bearer and via virtual network device 280 to circumvent a physical transmission system, such as an EPC. In some implementations, the bearer can be established via a cellular network type device 220 or via a non-cellular type network device 220.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel. In some implementations, some blocks may be omitted.

In some implementations, process 400 may be repeated for multiple client devices 215 and can be repeated concurrently for the multiple client devices 215. Additionally, or alternatively, process 400 may be repeated when virtual management element 270 receives updates to provisioning information for client device 215 (e.g., to re-provision client device 215, to modify transmission policies for data flows provided to/from client device 215, to modify authentication information of client device 215, etc.).

Figure 5:
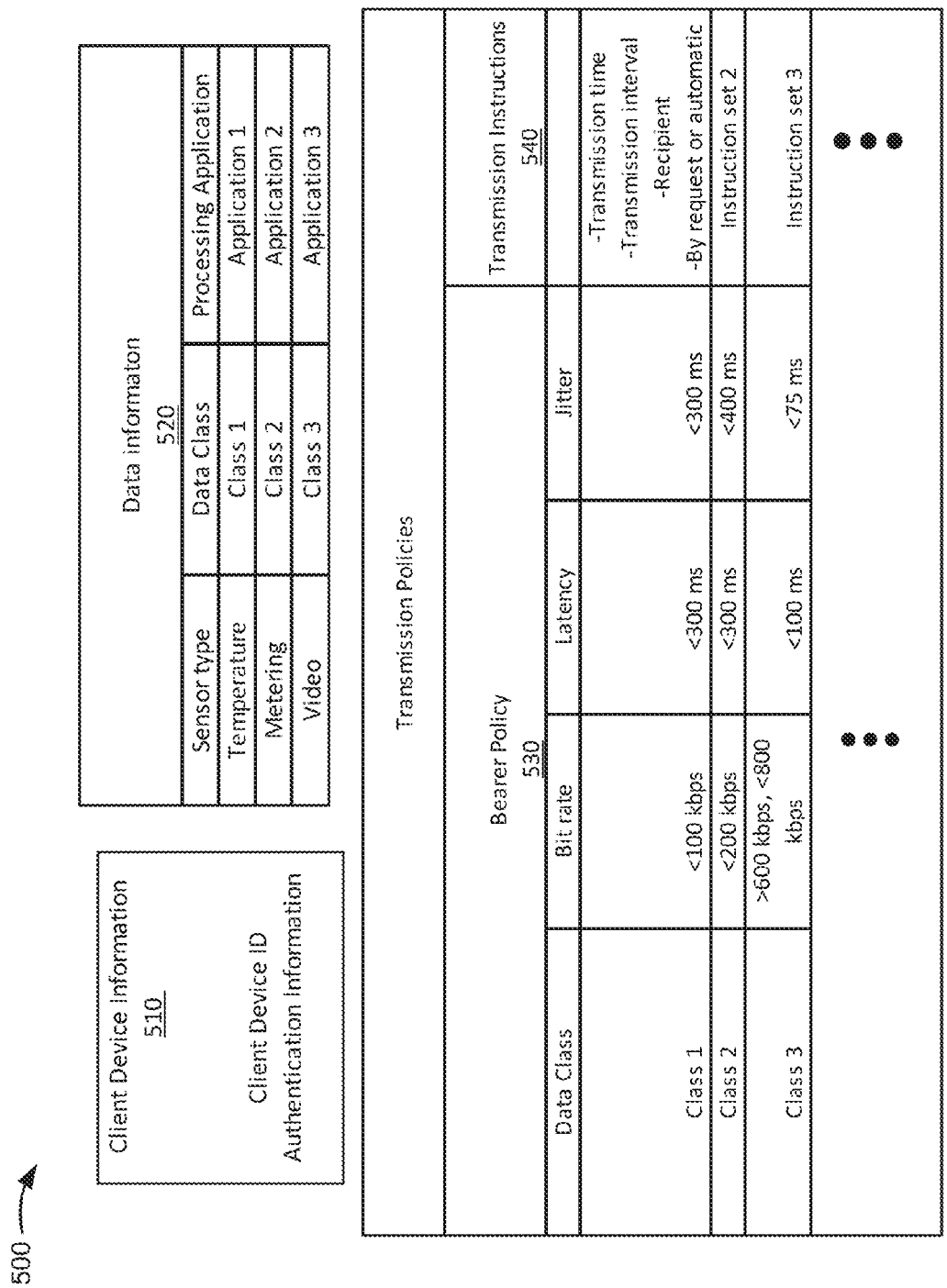
FIG. 5 illustrates an example data structure that may be stored by one or more devices in the environment of FIG. 2.

FIG. 5 illustrates an example data structure 500 that may be stored by one or more devices in environment 200, such as virtual management element 270, virtual policy element 275, and/or virtual network element 280. In some implementations, data structure 500 may be stored in a memory associated with virtual management element 270, virtual policy element 275, and/or virtual network element 280. In some implementations, data structure 500 may be stored in a memory separate from, but accessible by, virtual management element 270, virtual policy element 275, and/or virtual network element 280. In some implementations, data structure 500 may be stored by some other device in environment 200, such as user device 210, client device 215, network device 220, app device 225, SGW 230, MME 240, PGW 250, PCRF 260, and/or HSS/AAA server 265.

A particular instance of data structure 500 may contain different information and/or fields than another instance of data structure 500. One instance of data structure 500 may store provisioning information and transmission policy information regarding one client device 215 in environment 200, whereas another instance of data structure 500 may store provisioning information and transmission policy information regarding another client device 215 in environment 200.

As shown in FIG. 5, data structure 500 may include client device information field 510, data information field 520, bearer policy field 530, and transmission instructions field 540.

Client device information field 510 may include information that identifies a particular client device 215 associated with a particular instance of data structure 500. For example, client device information field 510 may store an identifier of client device 215 (e.g., a serial number, a broadcast identifier, a network address, or the like). Additionally, or alternatively, client device information field 510 may store authentication information associated with client device 215. For example, client device information field 510 may store credential information, an authentication key, and/or some other information that virtual network element 280 may use to authenticate client device 215 to access virtual network element 280 for data flow transmission services.

Data information field 520 may store information identifying data gathered by client device 215. For example, data information field 520 may store information identifying one or more sensors implemented by client device 215, a data class associated with data gathered by a sensor of client device 215, an application used to process data gathered by a sensor of client device 215, and/or some other information associated with data gathered by client device 215. For example, assume that client device 215 includes a temperature sensor. Further, assume that data gathered by the temperature sensor is categorized as class 1 data. Further, assume that client device 215 used application 1 to process data gathered by the temperature sensor. Given these assumptions, data information field 520 may store information to identify that client device 215 includes a temperature sensor and that the data gathered by the temperature sensor is categorized as class 1 data and is processed using application 1. In some implementations, data information field 520 may store information identifying a particular app device 225 with which client device 215 may provide data for data processing. As described below, the data class may correspond to a particular transmission policy. That is, class 1 data may be associated with a different transmission policy than class 2 data.

Bearer policy field 530 and transmission instructions field 540 may store transmission policies for data gathered by client device 215. As shown in FIG. 5, a transmission policy may be based on a data class. Bearer policy field 530 may store information identifying how a data flow, corresponding to the transmission of data gathered by client device 215, is to be treated (e.g., network resources that may be provided to transmit the data flow). For example, bearer policy field 530 may store information that identifies QoS policies for a bearer that is to transmit the data flows. As an example, assume that class 1 data is to be transmitted via a bearer that provides less than a 100 kilobits per second (kbps) bit rate, less than 300 milliseconds (ms) of latency, and less than 300 ms of jitter. Given these assumptions, bearer policy field 530 may store information that identifies that class 1 data is to be transmitted via a bearer that provides less than a 100 kilobits per second (kbps) bit rate, less than 300 milliseconds (ms) of latency, and less than 300 ms of jitter.

Transmission instructions field 540 may store information that identifies instructions for transmission of data gathered by client device 215. For example, transmission instructions field 540 may store information that identifies a time in which data is to be transmitted, an interval (e.g., a frequency) in which the data is to be transmitted, a recipient that may receive/access the data, and whether the data is to be provided based on a request or provided automatically. For example, the data may be provided automatically at a particular time and/or at a particular frequency. Additionally, or alternatively, the data may be provided based on an alert that is triggered when the value of the data satisfies a particular threshold. As an example, an alert may trigger when a temperature sensor detects a temperature that exceeds or drops below a particular threshold. Additionally, or alternatively, the alert may trigger when a motion detector detects a motion, when a meter detects when a resource level drops below a particular threshold, when a facility alarm switch is triggered based on unauthorized access, etc. In some implementations, data may be transmitted at off-peak times in order to reduce network load and to reduce costs associated with transmitting the data.

In some implementations, transmission policies stored by bearer policy field 530 and/or transmission instructions field 540 may be based on a subscription level of client device 215 and/or a subscription level of a user of client device 215. For example, different bearer policies and different transmission instructions may be associated with different subscription levels.

In some implementations, information stored by data structure 500 may correspond to provisioning information received by virtual management element 270 in block 410 of process 400. In some implementations, information stored by data structure 500 may be received from an operator user device 210 associated with client device 215, a repository that stores provisioning information for client device 215, and/or an image that virtual management element 270 may receive (e.g., from the operator user device 210, from a storage medium of virtual management element 270, and/or from some other source). In some implementations, virtual management element 270 may provision client device 215 based on information stored by data structure (e.g., in accordance with process 400). For example, virtual management element 270 may install/update applications that client device 215 is to use to process data gathered by client device 215 (e.g., based on information stored by data information field 520) and/or to direct client device 215 to provide data to a particular app device 225 for data processing. Additionally, or alternatively, virtual management element 270 may provide transmission instructions to client device 215 to cause client device 215 to transmit particular data in accordance with the transmission instructions.

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible. For example, data structure 500 may store billing information that identifies charges associated with providing data gathered by client device 215. In some implementations, the charges may be based on the bearer policies and/or the transmission instructions. For example, the charges may be based on the time of day at which data is transmitted (e.g., lower charges for data transmitted at off-peak times).

In some implementations, an operator user device 210, associated with client device 215, may communicate with virtual management element 270 (e.g., via a web portal) to select transmission polices based on charges that an operator or user of client device 215 may be willing to incur. In some implementations, information stored by bearer policy field 530 and/or transmission instructions field 540 may be based on the transmission policies selected by the operator.

Figure 6:
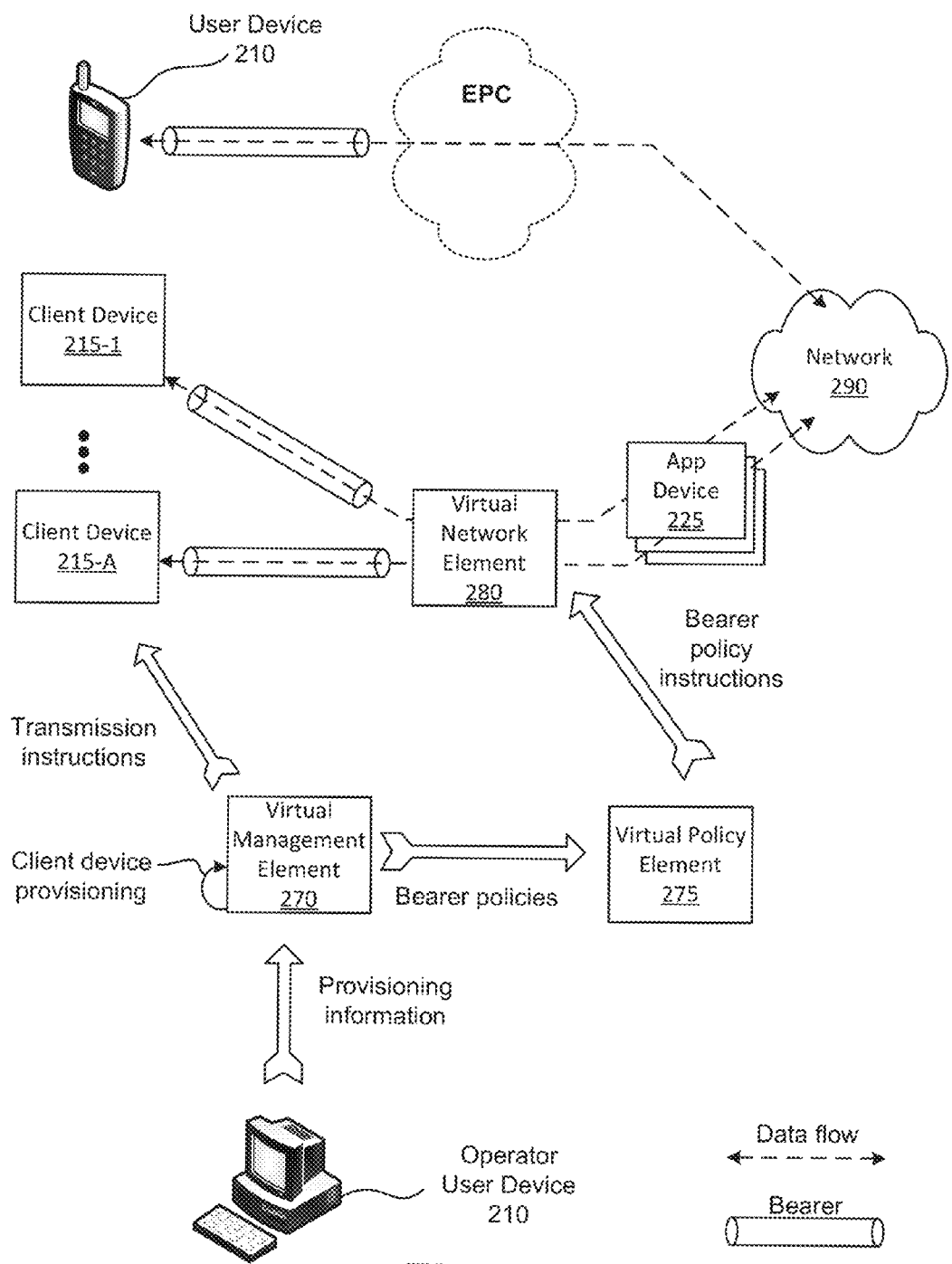
FIG. 6 illustrates an example implementation as described herein.

FIG. 6 illustrates an example implementation as described herein. As shown in FIG. 6, virtual management element 270 may receive provisioning information from operator user device 210. In FIG. 6, assume that the provisioning information includes information to provision multiple client devices 215 (e.g., client devices 215-1 through 215-A, where A>1). Given this assumption, virtual management element 270 may provision client devices 215-1 through 215-A based on the provisioning information and based on the status of each of client devices 215-1 through 215-A.

As shown in FIG. 6, virtual management element 270 may provide bearer policies (e.g., based on the provisioning information) to virtual policy element 275 to identify policies for bearers that are to be established between virtual network element 280 and each of client devices 215-1 through 215-A. Further, virtual management element 270 may provide transmission instructions to each of client devices 215-1 through 215-A. In some implementations, virtual policy element 275 may generate policy instructions to instruct virtual network element 280 to establish particular bearers with each of client devices 215-1 through 215-A. In some implementations, virtual network element 280 may establish multiple bearers for a particular client device 215 (e.g., such that data flows of different data flow classes are provided via different bearers). As shown in FIG. 6, client devices 215-1 through 215-A may transmit/receive data flows via virtual network element 280 and may circumvent a physical transmission system, such as an EPC that includes SGW 230, MME 240, and/or PGW 250. As a result, multiple client devices 215 may be provisioned as a group. Further, each of client devices 215-1 through 215-A may transmit/receive data flows (e.g., to/from app device 225 and/or to/from some other destination/origin) without involving the EPC that may provide greater network resources than needed to transmit the data flows.

While a particular example is shown in FIG. 6, it will be apparent that the above description is merely an example implementation. Other examples are possible and may differ from what was described with regard to FIG. 6.

FIGS. 7A-7B illustrate example implementations as described herein. In FIGS. 7A-7B, assume that client device 215 has been provisioned and prepared to transmit/receive data flows (e.g., to/from app device 225 and/or to/from some other device) via virtual network element 280. As shown in FIGS. 7A-7B, client device 215 may transmit/receive data flows via virtual network element 280 (e.g., to circumvent a physical transmission system, such as one or more network devices (e.g., gateways) of the physical transmission system in order to alleviate load associated with the physical transmission system) regardless of the type of network device 220 used by client device 215 for connectivity. For example, as shown in FIG. 7A, client device 215 may connect with a cellular type network device 220 (e.g., a network device 220 that is associated with a cellular network, such as an eNB network device, a mobile access point device that communicates with an eNB device, a macro cell network device 220, or the like). As shown in FIG. 7A, network device 220 may transmit data flows via virtual network element 280 using a VRF technique and/or via a virtual private network (VPN). For example, when client device 215 connects with network device 220, client device 215 may provide an instruction to direct network device 220 to create a VRF/VPN tunnel with virtual network element 280. In some implementations, network device 220 may store multiple instances of a particular routing table to cause data flows to be transmitted via virtual network element 280. In some implementations, network device 220 may transmit data flows via virtual network element 280 using some other technique. As a result, the data flows may circumvent a physical transmission system (e.g., an EPC, or the like) in order to alleviate network load associated with the physical transmission system.

In some implementations, as shown in FIG. 7B, client device 215 may transmit/receive data flows via virtual network element 280 when client device 215 connects with a non-cellular network device 220 for connectivity (e.g., a non-cellular wireless access point, hub, switch, router, gateway, femto cell device, etc.). In some implementations, a data flow may be transmitted over an unmanaged network (e.g., a WAN, such as the internet) towards virtual network element 280. In some implementations, the data flow may be transmitted to virtual network element 280 through a firewall via a security gateway and based on authentication and authorization protocols. For example, when transmitting a data flow, client device 215 may include authentication and/or authorization information to access virtual network element 280 via the security gateway. In some implementations, the security gateway may include a femto cell gateway, an enhanced Packet Data Gateway (ePDG), or the like.

As a result, client device 215 may transmit/receive data flows via virtual network element 280 (e.g., to circumvent a physical transmission system, such as an EPC or the like) regardless of the type of network device 220 used by client device 215 for connectivity. In some implementations (e.g., to reduce network traffic associated with a cellular network), client device 215 may include an instruction to transmit/receive data flows via a non-cellular network device 220 when the non-cellular network device 220 is available to transmit data flows. In some implementations (e.g., to prevent interruption in transmitting/receiving data flows), client device 215 may include an instruction to transmit/receive data flows via a cellular network device 220 when a non-cellular network device 220 is not available to transmit data flows. In some implementations, client device 215 may include an instruction to transmit/receive data flows via a particular network device 220 based on availability of the particular network device 220, network resources that can be provided by the particular network device 220, network performance of the particular network device 220 (e.g., packet loss rates, latency, jitter, signal strength, etc.), and/or based on some other factor.

While particular examples are shown in FIGS. 7A-7B, it will be apparent that the above descriptions are merely example implementations. Other examples are possible and may differ from what was described with regard to FIGS. 7A-7B.

In some implementations, virtual network element 280 may transmit a data flow provided to/from client device 215 (e.g., an M2M device and/or some other type of device). For example, client device 215 may transmit/receive data flows relating to data gathered and processed by client device 215 (e.g., via one or more sensors and applications of client device 215).

In some implementations, the systems and/or methods, described herein, may offload network load from a physical transmission system by transmitting data flows via a virtual transmission system to circumvent the physical transmission system. In some implementations, the systems and/or methods may conserve network resources by providing only the network resources needed to transmit the data flows, associated with client device 215, without providing excess network resources that may not be needed. In some implementations, virtual management element 270 may provide provisioning services to prepare client device 215 for data flow transmission.

In some implementations, virtual management element 270 may be used to concurrently provision multiple client devices without the need to separately provision each client device. Also, in some implementations, managing subscriptions of client device 215 via virtual management element 270 may be more cost-effective than managing subscriptions via a physical transmission system. In some implementations, client device 215 may transmit/receive data flows via virtual network element 280 regardless of the type of network device 220 used by client device 215 for connectivity.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by one or more devices, provisioning information for a client device,
      the one or more devices including one or more virtual elements associated with a virtual transmission system that emulates one or more physical devices of a physical transmission system;
   provisioning, by the one or more devices, the client device to prepare the client device to receive or transmit particular data flows based on the provisioning information,
      the particular data flows to be processed via the one or more virtual elements of the virtual transmission system;
   receiving, by the one or more devices, a data flow;
   identifying, by the one or more devices, the data flow as one of the particular data flows to be processed by the one or more virtual elements of the virtual transmission system; and
   transmitting, by the one or more devices, the data flow from the client device or to the client device, via the one or more virtual elements, based on provisioning the client device and based on identifying the data flow as one of the particular data flows,
      the data flow being transmitted or received via the one or more virtual elements to circumvent one or more gateways of the physical transmission system.

2. The method of claim 1, further comprising:
   identifying a status of the client device;
      where provisioning the client device is based on identifying the status of the client device.

3. The method of claim 1, where the provisioning information includes information associated with a quality of service (QoS) policy, the method further comprising:
  establishing a bearer between the client device and the one or more virtual elements,
    the bearer including the information associated with the QoS policy,
    where provisioning the client device includes establishing the bearer.

4. The method of claim 1, where the provisioning information includes transmission instructions for the client device, the method further comprising:
  providing the transmission instructions to the client device to cause the client device to provide the data flow in accordance with the transmission instructions,
    where provisioning the client device includes providing the transmission instructions.

5. The method of claim 1, where the client device is one of a plurality of client devices and where the provisioning information is associated with the plurality of client devices, the method further comprising:
  provisioning the plurality of client devices based on the provisioning information.

6. The method of claim 1, further comprising:
  establishing a bearer with the client device via a cellular network device to allow the client device to access the one or more virtual elements.

7. The method of claim 1, further comprising:
  establishing a bearer with the client device via a non-cellular network device to allow the client device to access the one or more virtual elements.

8. The method of claim 1, where the client device is a machine-to-machine (M2M) device.

9. A system comprising:
  one or more devices including one or more virtual elements, associated with a virtual transmission system that emulates one or more physical devices of a physical transmission system, to:
    receive provisioning information for a client device;
    provision the client device to prepare the client device to receive or transmit particular data flows based on the provisioning information,
      the particular data flows to be processed via the one or more virtual elements of the virtual transmission system, rather than the physical transmission system;
    receive a data flow;
    identify the data flow as one of the particular data flows to be processed by the one or more virtual elements of the virtual transmission system; and
    transmit the data flow from the client device or to the client device via the one or more virtual elements based on provisioning the client device and based on identifying the data flow as one of the particular data flows,
      the data flow being transmitted or received via the one or more virtual elements to circumvent one or more gateways of the physical transmission system,
      the physical transmission system providing different network resources than virtual transmission system.

10. The system of claim 9, where the one or more devices are further to:
  identify a status of the client device;
    where when provisioning the client device, the one or more devices are to provision the client device based on identifying the status of the client device.

11. The system of claim 9, where the provisioning information includes information associated with a quality of service (QoS) policy, where the one or more devices are further to:
  establish a bearer between the client device and the one or more virtual elements,
    the bearer including the information associated with the QoS policy,
    where when provisioning the client device, the one or more devices are to establish the bearer.

12. The system of claim 9, where the provisioning information includes transmission instructions for the client device, where the one or more devices are further to:
  provide the transmission instructions to the client device to cause the client device to provide the data flow in accordance with the transmission instructions,
    where when provisioning the client device, the one or more devices are to provide the transmission instructions.

13. The system of claim 9, where the client device is one of a plurality of client devices and where the provisioning information is associated with the plurality of client devices, where the one or more devices are further to:
  concurrently provision the plurality of client devices based on the provisioning information.

14. The system of claim 9, where the one or more devices are further to:
  establish a bearer with the client device via a non-cellular network device or via a cellular device to allow the client device to access the one or more virtual elements.

15. The system of claim 9, where the client device is a machine-to-machine (M2M) device.

16. A non-transitory computer-readable medium for storing instructions, the instructions comprising:
  a plurality of instructions which, when executed by one or more processors associated with a one or more devices including one or more virtual elements, associated with a virtual transmission system that emulates one or more physical devices of a physical transmission system, cause the one or more processors to:
    receive provisioning information for a client device;
    identify a status of the client device;
    provision the client device to prepare the client device to receive or transmit particular data flows based on the provisioning information and based on the status of the client device,
      the particular data flows to be processed via the one or more virtual elements of the virtual transmission system;
    receive a data flow;
    identify the data flow as one of the particular data flows to be processed by the one or more virtual elements of the virtual transmission system; and
    transmit the data flow from the client device or to the client device via the one or more virtual elements based on provisioning the client device and based on identifying the data flow as one of the particular data flows,
      the data flow being transmitted or received via the one or more virtual elements to circumvent one or more gateways of the physical transmission system.

17. The non-transitory computer-readable medium of claim 16, where the provisioning information includes information associated with a quality of service (QoS) policy,
  where the plurality of instructions further cause the one or more processors to:

establish a bearer between the client device and the one or more virtual elements, the bearer including the information associated with the QoS policy, where one or more instructions, of the plurality of instructions, to provision the client device, cause the one or more processors to establish the bearer.

18. The non-transitory computer-readable medium of claim 16, where the provisioning information includes transmission instructions for the client device, where the plurality of instructions further cause the one or more processors to:

provide the transmission instructions to the client device to cause the client device to provide the data flow in accordance with the transmission instructions, where one or more instructions, of the plurality of instructions, to provision the client device, cause the one or more processors to provide the transmission instructions.

19. The non-transitory computer-readable medium of claim 16, where the client device is one of a plurality of client devices and where the provisioning information is associated with the plurality of client devices, where the plurality of instructions further cause the one or more processors to:

concurrently provision the plurality of client devices based on the provisioning information.

20. The non-transitory computer-readable medium of claim 16, where the plurality of instructions further cause the one or more processors to:

establish a bearer with the client device via a non-cellular network device or via a cellular device to allow the client device to access the one or more virtual elements.

\* \* \* \* \*